INVENTORS
KARL A. BRANDENBERG &
LOREN R. BART
BY
Gardner & Zimmerman
ATTORNEYS

United States Patent Office 3,185,177
Patented May 25, 1965

3,185,177
THREE-WAY SOLENOID VALVE
Karl A. Brandenberg, San Leandro, and Loren R. Bart, Hayward, Calif., assignors to Modernair Corporation, San Leandro, Calif., a corporation of Ohio
Filed Sept. 28, 1962, Ser. No. 226,959
4 Claims. (Cl. 137—625.27)

This invention relates to solenoid valves in general, and is particularly directed to a three-way solenoid valve wherein the closing force on the valving member is generated in a unique simplified manner.

Various solenoid valves are known wherein a valving member is movable between positions respectively in closing engagement with opposed inlet and exhaust passage in response to deenergized and energized states of a solenoid. Commonly when the inlet is closed by the valving member, the open exhaust passage is communicated with an outlet passage; similarly when the valving member closes the exhaust passage, the open inlet passage is communicated with the outlet passage. Thus, a three-way valving action is obtained in response to the movements of the valving member effected upon energization and deenergization of the solenoid. To facilitate the desired movements of the valving member between its several positions, a loading spring is usually employed to retain the member in a normal position of closing engagement with, for example, the inlet passage. Upon energization of the solenoid, a magnetic force is exerted on the valving member in a direction to overcome the spring force and move same out of engagement with the inlet passage and into closing engagement with the exhaust passage. In order that the valving member engage the exhaust passage with a closing force separated from the magnetic force, it has been the practice to generate an auxiliary force by means of a second spring in operative association with the valving member. Arrangements of this type which employ a second spring are relatively complex in design and limited in life due to the susceptibility of the spring to damage.

Accordingly, it is an object of the present invention to provide a solenoid valve which features a valving member of simplified design facilitated by an improved mechanism for imparting an auxiliary closing force thereto.

Another object of the invention is to provide a solenoid valve having a magnetic plunger and sealing member incorporated in a plunger assembly in such a manner that the sizeable magnetic force acting on the plunger is separated from that acting on the sealing member, and an auxiliary force supplements the very small magnetic force acting on the sealing member whereby the over-all closing force operating on the sealing member is commensurate with reduced wear thereof.

A further and extremely important object of the invention is to provide a solenoid valve of the class described having a valving member which is so arranged that the closing force thereof exerted against an exhaust passage seat is created in large part by air pressure acting at the inlet passage.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Figure 1:
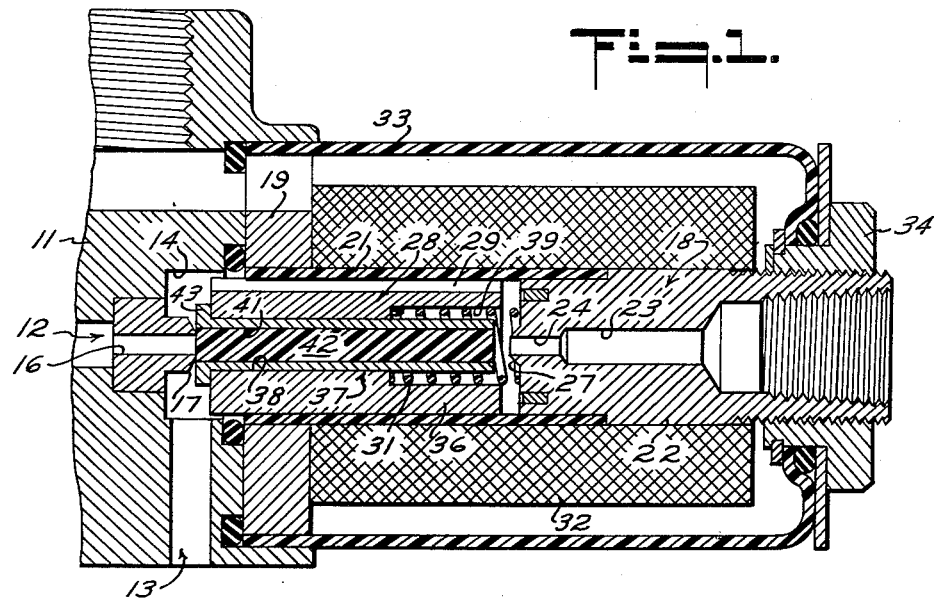
FIGURE 1 is a sectional view taken at a diametric plane through a solenoid valve in accordance with the invention, the valving member thereof being depicted in its normal unactuated position.

Referring now to the drawing, the valve of the present invention will be seen to include a body 11 having an inlet passage 12 and outlet passage 13 communicated at a recess 14 in one end face of the body. An orifice member or equivalent means are provided to terminate the inlet passage in a constructed portion 16 circumscribed by an annular seat 17 which projects coaxially from the base of the recess. A stem assembly 18 is secured to the end face of the body in sealed closing relation to the recess 14 to define therewith a sealed valve chamber. The stem assembly preferably includes a flux plate 19 of magnetic material secured to the body and transpierced by a non-magnetic guide tube 21 projecting coaxially outward from the plate. An elongated cylindrical stem 22 of magnetic material is coaxially secured to the outer end of the guide tube in closing relation thereto. The stem is provided with an exhaust passage 23 coaxially therethrough. Such passage preferably includes a constricted portion 24 extending coaxially through a boss which projects centrally from the end face of the stem into the tube to thus define an annular seat 27 circumscribing the constricted portion of the exhaust passage.

Figure 2:
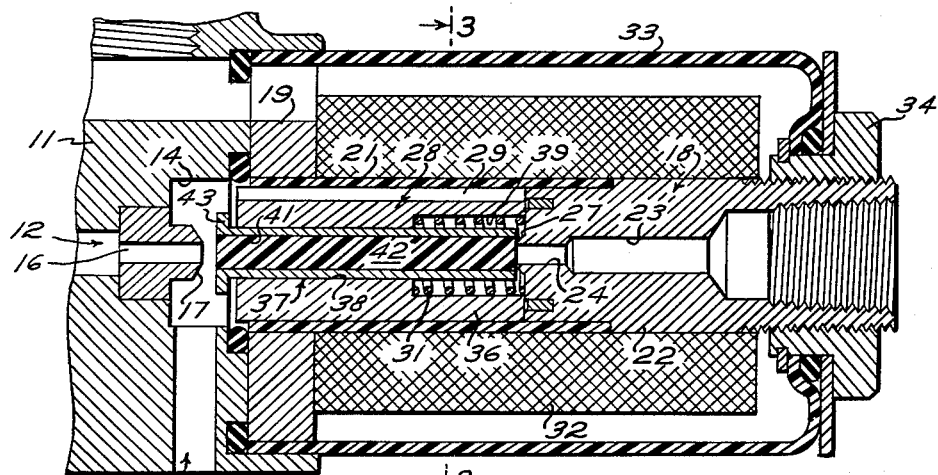
FIGURE 2 is a view similar to FIGURE 1, but with the valving member depicted in its actuated position.
Figure 3:
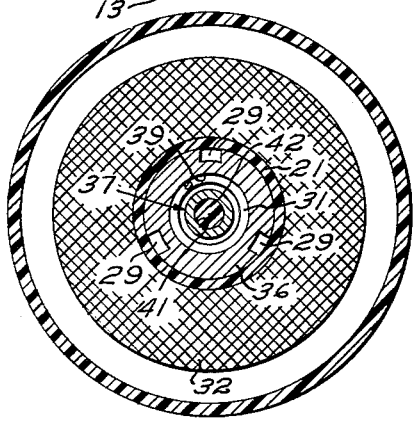
FIGURE 3 is a sectional view taken at line 3—3 of FIGURE 2.

Within the guide tube 21 there is disposed a valving member in the form of a slidable plunger assembly 28 axially movable between a first position in engagement with seat 17 and in closing relation to inlet passage 12 (see FIGURE 1), and a second position in engagement with seat 27 and in closing relation to exhaust passage 23 (see FIGURE 2). The plunger assembly is provided with longitudinally extending passages such as slots 29 which serve to communicate the exhaust passage 23 with recess 14 when the plunger assembly is in its first position. In addition the plunger assembly is normally retained in its first or unactuated position as by means of the loading spring 31.

In order to facilitate selective movement of the plunger assembly 28 from its normal unactuated position to its second, or actuated position, such assembly is arranged to be attractable by a magnetic field generated upon energization of a solenoid 32 concentrically disposed about the stem assembly 18 in end abutment with the flux plate 19 thereof. More particularly, the plunger assembly is for the most part of magnetic material such that a magnetic force is exerted thereon in response to energization of the solenoid. The magnetic force acts to oppose and overcome the force of spring 31 to hence move the plunger assembly to its actuated position closing exhaust passage 23. In this position, communication is established between the inlet and outlet passages 12 and 13 through the recess 14. Upon deenergization of the solenoid 32, the magnetic force on the plunger assembly is terminated and the loading force exerted by spring 31 is effective in returning the plunger assembly to its unactuated position closing the inlet passage 12. At this time communication is established between the outlet passage 13 and exhaust passage 23 through the slots 29 in the plunger assembly.

To complete the general construction of the valve, a cover 33 of non-magnetic material is preferably included to enclose the solenoid 32. More particularly, the cover is advantageously of a cupped configuration and secured at its open end to the end face of the body 11 in spaced concentric relation to the solenoid. The stem 22 then transpierces the closed end of the cover and is secured thereto as by means of a nut 34, preferably of magnetic material.

It will thus be appreciated that the valve as described to this point is generally similar in construction and function to conventional solenoid valves as arranged to produce a three-way valving action. A unique and particularly advantageous departure from conventional design, however, is embodied in the plunger assembly 28. More particularly, it is generally desirable for purposes of reducing wear that means be incorporated in the plunger assembly to generate an auxiliary force for effecting closure of the exhaust seat which is separated from the sizeable magnetic force generated by the solenoid upon the plunger assembly. In the past a relatively complex plunger design entailing the use of a second loading spring has been employed to facilitate generation of the auxiliary force. The simplified plunger assembly 28 in accordance with the present invention eliminates the second loading spring and its associated components, and instead is arranged such that inlet air pressure applied to the inlet passage 12 creates the auxiliary closing force against the exhaust passage seat 27.

Considering now the plunger assembly 28 in particular detail as to its salient aspects, it will be noted that the assembly comprises a cylindrical centrally bored plunger 36 having a seal pin 37 axially slidable in its bore 38. The plunger is of magnetic material and disposed within the guide tube 21 in axially slidable relation thereto. The end of the plunger adjacent the stem 22 is preferably formed with a coaxial cylindrical recess 39 defining an enlarged termination of the bore 38. The recess serves as a mounting well for the loading spring 31 which is preferably of the coil type and coaxially disposed within the recess with one end projecting from the plunger into contact with the stem. By virtue of the arrangement the spring acts to force the plunger in the direction of the body 11.

The seal pin 37 is of magnetic material and includes an axial bore 41 filled with a resilient insert 42 of molded and bonded rubber, or equivalent material. The pin has an outwardly flared head 43 which is engageable with the end face of the plunger adjacent the body 11. Thus, the plunger as urged by the spring 31 engages the head 43 to in turn force the pin into engagement with the seat 17 as depicted in FIGURE 1, sealing contact being made by the end of the resilient insert 42.

It is particularly important to note that the relative lengths of the seal pin 42 and plunger 28 are such that when they are in their unactuated position with the pin engaging the seat 17, the distance between the plunger 28 and end face of the stem 22 is greater than the distance between the tip of the seal pin 42 and seat 27. Hence, when the solenoid 32 is energized and magnetic force is exerted on the entire plunger assembly, the magnetic force on the plunger overcomes the force of spring 31 to move the plunger into engagement with the stem as depicted in FIGURE 2. Since the pin head 43 is now disengaged from the end face of the plunger, the pin is free to move in the axial direction towards the seat 27. The magnetic force on the seal pin to some extent effects such movement. However, the principal force acting on the seal pin is exerted by the inlet pressure in inlet passage 12. The resultant closing force arising from the combined effects of the magnetic field and inlet pressures urges the pin into engagement with the seat 27 with the insert 42 effecting a seal thereat to close the exhaust passage 23.

It is of importance to note that aside from the relative simplicity of the plunger assembly 28, the design thereof prevents excessive wear on the seal means thereof, namely the pin insert 42. More particularly, since the sizeable magnetic force on the plunger 36 is stopped separately by the stem 22, the forces (both magnetic and air) acting on the seal pin are small by virtue of its relatively small size and wear on the insert is of a minimum order.

What is claimed is:

1. A solenoid valve comprising means defining an inlet passage terminating in an inlet seat within a valve chamber, said inlet passage connectable to a pressurized air source, means defining an outlet passage communicating with said chamber, a stem assembly including means defining a guide bore coaxially extending from said chamber and means defining an exhaust passage terminating in an exhaust seat at an end wall of said bore in coaxial opposition to said inlet seat, a solenoid disposed about said stem assembly for generating a magnetic field within said bore upon energization of the solenoid, a plunger slidably disposed within said bore for movement coaxially thereof, said plunger spring loaded in the direction of said inlet seat and magnetically attractable by said magnetic field in the direction of said exhaust seat, and a seal pin coaxially transpiercing said plunger in slidable relation thereto, said pin having a head on one end thereof engageable by the end of said plunger facing said inlet seat, said seal pin having two limits of axial movement respectively in engagement with said inlet seat and said exhaust seat.

2. A solenoid valve according to claim 1, wherein said inlet and exhaust seats are oppositely annularly projecting and said plunger and seal pin have relative lengths such that the distance between the plunger and said end wall exceeds the distance between said pin and said exhaust seat when said pin engages said inlet seat and said plunger engages the head of said pin.

3. A solenoid valve comprising a body having a cylindrical recess in one end face thereof, said body having an inlet passage including a constricted portion terminating in an annular inlet seat projecting coaxially from the base of said recess, said body having an outlet passage communicating with said recess, a flux plate of magnetic material secured to said one end face of said body and having an aperture in registry with said recess, a tubular guide member of non-magnetic material disposed in said aperture and coaxially projecting from said flux plate on the opposite side thereof from said body, a stem of magnetic material coaxially secured to the projecting end of said guide member in closing relation thereto, said stem having an exhaust passage including a constricted portion terminating in an annular exhaust seat projecting centrally from said stem into said guide member, a solenoid concentrically disposed about said guide member in end abutment with said flux plate, a plunger of magnetic material slidably disposed in said guide member, a seal pin of magnetic material coaxially transpiercing said plunger in slidable relation thereto, said pin having a head on one end thereof engageable by the end of said plunger facing said inlet seat, said seal pin having two limits of axial movement respectively in engagement with said inlet seat and said exhaust seat, and means spring loading said plunger to a normal position wherein said plunger engages the head of said pin and said pin engages said inlet seat.

4. A solenoid valve according to claim 3, further defined by said pin being spaced from said exhaust seat by a lesser distance than the spacing between said plunger and said stem when said plunger is in said normal position.

References Cited by the Examiner

UNITED STATES PATENTS 3,043,336   7/62   Parent et al. _____ 137—625.27 X

FOREIGN PATENTS 660,750   6/38   Germany.
590,052   3/59   Italy.

M. CARY NELSON, *Primary Examiner.*

MILTON KAUFMAN, MARTIN P. SCHWADRON,
*Examiners.*